US011983574B1

(12) United States Patent
Ravindran (10) Patent No.: US 11,983,574 B1
(45) Date of Patent: May 14, 2024

(54) WORKLOAD OPTIMIZATION THROUGH CONTEXTUAL BANDITS

(71) Applicant: Intuit, Inc., Mountain View, CA (US)

(72) Inventor: Akshay Ravindran, Edmonton (CA)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 18/215,756

(22) Filed: Jun. 28, 2023

(51) Int. Cl.
*G06F 9/50* (2006.01)

(52) U.S. Cl.
CPC ............ *G06F 9/505* (2013.01); *G06F 9/5033* (2013.01); *G06F 9/5044* (2013.01)

(58) Field of Classification Search
None
See application file for complete search history.

(56) References Cited

U.S. PATENT DOCUMENTS

| 10,320,625 | B1* | 6/2019 | Cherumbath | ....... H04L 41/0806 |
| 11,507,430 | B2* | 11/2022 | Subramanian | ........... G06N 3/04 |
| 11,797,340 | B2* | 10/2023 | Cao | ........ G06F 18/214 |
| 2021/0224082 | A1* | 7/2021 | Suo | ........ G06N 20/00 |

* cited by examiner

*Primary Examiner* — Eric C Wai
(74) *Attorney, Agent, or Firm* — Dinsmore & Shohl LLP (57) ABSTRACT

Certain aspects of the disclosure provide systems and methods for receiving a request to process a workload on a remote processing system; determining one or more workload requirements associated with processing the workload; and processing the one or more workload requirements with a contextual bandit machine learning model to generate a processing configuration for the remote processing system. The remote processing system provisions resources based on the processing configuration and processes the workload.

20 Claims, 7 Drawing Sheets

WORKLOAD OPTIMIZATION THROUGH CONTEXTUAL BANDITS

BACKGROUND

Field

Aspects of the present disclosure relate to optimized process configurations for processing workloads on processing systems.

Description of Related Art

Cloud computing services provide on-demand computing resources for processing compute tasks. Generally, cloud computing services use virtualization to provide virtual computing devices to enable scalable systems of multiple independent devices. Each computing device provides compute, storage, and networking capabilities which may be combined, distributed, or allocated as needed for a specific task.

Cloud computing services may provide hardware, operating system, software, networking features, database, analytics, application services, deployment, management, machine learning, mobile, developer tools, and other services to enable processing of various compute tasks.

Generally, in order for a workload (or task) to process using a cloud computing service, the workload will require various resources, such as compute, storage, and network resources. Many cloud computing services offer on-demand resources, meaning the cloud computing service will supply the required resources from various computing devices for a specific workload. Once the required resources are available, the workload will process using the resources supplied by the cloud computing service.

Different workloads may require different amounts of resources to process effectively. An insufficient provisioning of resources may result in reduced functionality or inoperability of a workload, while excess provisioned resources lead to various system and financial inefficiencies, such as idle compute that could be tasked to other workloads, wasted costs, etc. Thus, there is a need to optimize workload processing configurations to minimize the resources needed while maximizing functionality for processing workloads.

Currently, some methods for managing workload resources include reserving capacity, spot capacity, auto-scaling, etc. A reserving capacity method allows for reserving of specific resources on a cloud computing service for processing workloads; however, the specific resources may not meet the requirements for every workload. A spot resource method allows for a workload to process using unused capacity; however, a workload may be interrupted by other processes because the spot resources are not specifically reserved for the workload. Auto-scaling allows for scaling up and down of the available resources as needed for a particular workload; however, each workload must be managed (e.g., scaled up and down) individually. Further, auto scaling down (or downscaling) of a workload may result in insufficient resources and a workload that does not process correctly or efficiently.

Thus, there is a need in the art for methods to optimize processing configurations for workloads executing on scalable processing systems, such as remote "cloud" processing systems.

SUMMARY

In one aspect, a method, includes receiving a request to process a workload on a remote processing system; determining one or more workload requirements associated with processing the workload; and processing the one or more workload requirements with a contextual bandit machine learning model to generate a processing configuration for the remote processing system, wherein the contextual bandit machine learning model is trained to reduce processing resource usage by the remote processing system while meeting the one or more workload requirements.

In another aspect, a method, includes receiving a request to process a workload on a remote processing system; determining one or more workload requirements associated with processing the workload; setting a resource requirement based on the one or more workload requirements; and processing the one or more workload requirements and the resource requirement with a contextual bandit machine learning model to generate a processing configuration for the remote processing system, wherein the contextual bandit machine learning model is trained to reduce processing resource usage by the remote processing system while meeting the one or more workload requirements and the processing configuration uses the resource requirement.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for optimizing processing configurations for workloads processing on processing systems. Optimizing workload processing leads to many technical benefits, such as effective resource utilization, reduced cost, and higher processing throughput to name a few. As above, current methods for optimizing remote workloads have shortcomings in this regard, and leave workloads prone to processing configurations of resources that are either wasteful or ineffective for a given workload. This technical problem may be described in part as resulting from reactive, rather than proactive, processing configuration. Aspects described herein overcome these technical problems and provide the beneficial technical effect of proactively determining optimal processing configurations that may be used to process workloads, for example, on remote, scalable processing systems, such as cloud processing system. As described further herein, aspects implement contextual bandit machine learning models to generate an optimized processing configuration for a workload by training the contextual bandit model to "right-size" processing configurations proactively and thereby to ensure both sufficient resources for the workload and to avoid wasted (e.g., provisioned but idled) resources for the workload. Thus, the efficiency of the processing system as a whole is improved, wasted resources are avoided, overall processing throughput is increased, and the like.

In particular, aspects described herein overcome technical problems extant in the art and reduce resources required to process a workload, such as using a cloud computing service, without reducing the efficiency of the workload. Generally, the total processing resources needed for processing a workload on a processing system cannot be computed reliably before processing the workload—especially where the workload is to be processed using remote, and in some cases variable, resources. For example, a most efficient processing configuration for a workload may require a specific, but unknown a priori, processing configuration for a remote processing system. Consequently, a processing configuration may hedge towards excess resources to avoid functional problems, incurring cost and system waste. Alternatively, a processing configuration may try to eliminate resource waste, but in doing so, compromise the workload processing. Aspects described herein use trained machine learning models to eliminate the guess and check approach and optimize processing configuration on the front end to maximize efficiency of the workload processing.

Aspects described herein provide this technical solution to the technical problem by utilizing a contextual bandit model to analyze requirements for workload processing and generating a processing configuration with the optimal resources. Beneficially, aspects described herein may reduce waste of resources, such as compute, processing power, memory, storage, etc., needed to process a workload while maintaining adequate performance. Further, aspects described herein may optimize processing configurations at a per-workload level to ensure efficiency is optimized for every workload.

Contextual Bandit Machine Learning Model

Contextual bandit are machine learning models trained to find an optimal solution through an exploration and exploitation tradeoff. A contextual bandit balances exploring new scenarios with exploiting the best known scenarios. Further, a contextual bandit utilizes information about the environment to personalize an outcome for every scenario. A contextual bandit may test different actions for a scenario and learn the action that is the most rewarding for the scenario. Beneficially, a contextual bandit model may be used even where there is not a known reward for every alternative scenario because the reward value may be estimated using a reward function to evaluate a set of contexts. Thus, contextual bandit machine learning models are a good fit for the technical problems described herein.

As described herein, a contextual bandit machine learning model may be trained to determine a most efficient processing configuration that avoids wasted resources (e.g., provisioned but unused resources) while still meeting workload requirements. The model may explore and exploit different processing configurations for a particular workload and reward efficient performance of the workload using different processing configurations. For example, the model may balance the differences between a champion workload execution (e.g., best performance) and a contender workload execution (e.g., sufficient performance) to maintain performance efficiency. Beneficially, resources may be saved, for example, compute, memory, storage, etc., while maintaining workload performance. Beneficially, then, the processing system for the workload avoids over-provisioning resources or under-provisioning resources needed to process the workload.

In some embodiments, the contextual bandit model may explore and exploit different processing configurations for a particular workload under specific constraints, such as a process configuration with a specified resource requirement. For example, where a particular resource is available for processing the workload, the contextual bandit model may generate an optimal processing configuration utilizing the particular resource. Beneficially, the generated processing configuration includes the available resource. This may be beneficial in situations where it is desirable to maximize or minimize a particular resource and optimize the rest of the processing configuration. For example, where it may be desirable to exploit one resource, such as where more compute is available, the contextual bandit model may generate a processing configuration with more compute. In another example, where it may be desirable to reduce one resource, such as where less memory is available, the contextual bandit model may generate a processing configuration with less memory.

Example Optimization System

Figure 1:
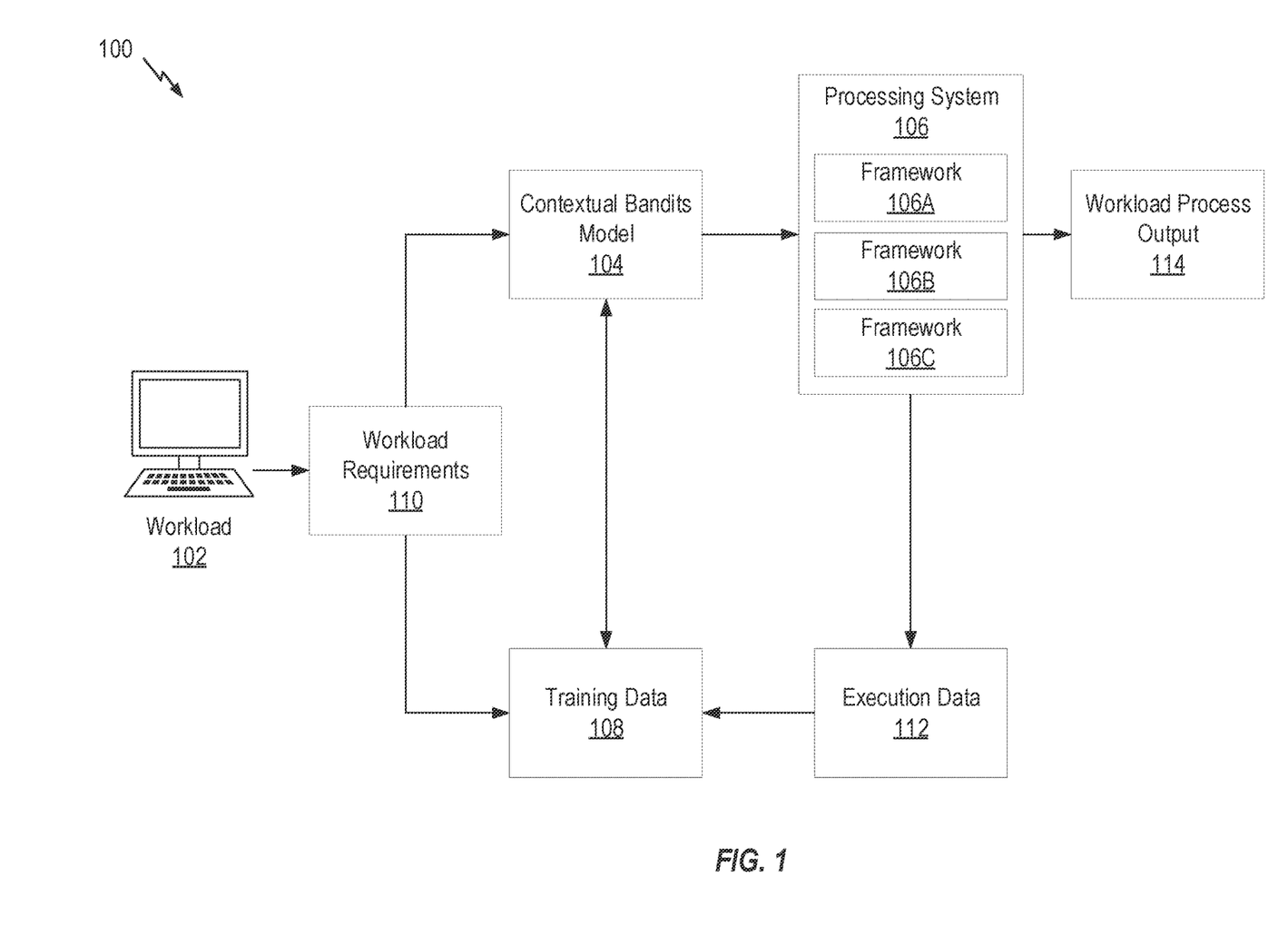
FIG. 1 depicts an example optimization system.

FIG. 1 depicts an example optimization system 100 for optimizing processing of workload 102 on processing system 106. Workload 102 may be, for example, an extract, transform, load (ETL) job. An ETL job is a data processing workload in which data is extracted from one or more sources, transformed to clean-up the data for processing, and then loaded into a target database for further downstream analytics. ETL jobs often involve large amounts of data and require massive resources to process. Cloud computing services often used to process these ELT jobs because the cloud computing service can supply these massive resources and coordinate the processing. However, as discussed, under-provisioning resources may result in a failed ETL job, while over-provisioning resources may waste resources when processing an ETL job.

Note, while ETL jobs are described herein as one example use case, many other use cases are possible. Various other workloads, for example, may include containers, databases, micro-services, and virtual machines. In another example, other workloads may include sandboxes, which create isolated environments for applications to run securely.

Processing system 106 may be a remote processing system, for example, a cloud computing service, comprising different types of data processing frameworks, such as framework 106A, framework 106B, and framework 106C, that may process a workload. Such frameworks may include algorithms, architectures, processes, and/or services for processing workload 102 on processing system 106. In some embodiments, processing system 106 may be a local processing system.

Workload requirements 110 are processing requirements for workload 102, which may be optimized by contextual bandit model 104. Contextual bandit model 104 may be any contextual bandit machine learning model, for example, a linear contextual bandit, a tree-based contextual bandit, a deep contextual bandit, or a Thompson sampling contextual bandit. Contextual bandit model 104 may be trained to output an efficient processing configuration of the processing resources to be used by processing system 106 while processing workload 102.

Contextual bandit model 104 is trained using training data 108. Training data 108 may include workload requirements 110 associated with workload 102, as described in further detail with respect to FIG. 2. Training data 108 may further include execution data 112 from processing system 106, as described in further detail with respect to FIG. 2.

Contextual bandit model 104 may generate a processing configuration for processing workload 102 on processing system 106. The processing configuration may be optimized resources required to process workload 102, such as based on requirements associated with workload 102, described in further detail with respect to FIG. 2. The processing configuration may be configured to select a data processing framework and a number of instances of the data processing framework for processing the workload. The data processing framework and number of instances may be used by the processing system 106 to process workload 102. The data processing framework configures one or more instances to process workload 102. Instances are formed in different classes, for example, compute intensive instances, memory intensive instances, or graphics intensive instances. For example, compute intensive instances may be used when a workload requires more compute to process. Memory instances may be used when a workload requires more memory to process. Graphics instances may be used when a workload has higher graphics requirements. An instance has one or more nodes to manage and complete tasks of the workload. The number and type of nodes in an instance may depend on the data processing framework and the requirements for the workload, such as compute, memory, and storage requirements.

Processing system 106 processes workload 102 using the processing configuration determined by contextual bandit model 104 to generate workload process output 114. For example, where the workload is an ETL workload, the generated workload process output may be the transformed data.

Example Workload Requirements and Execution Data

Figure 2:
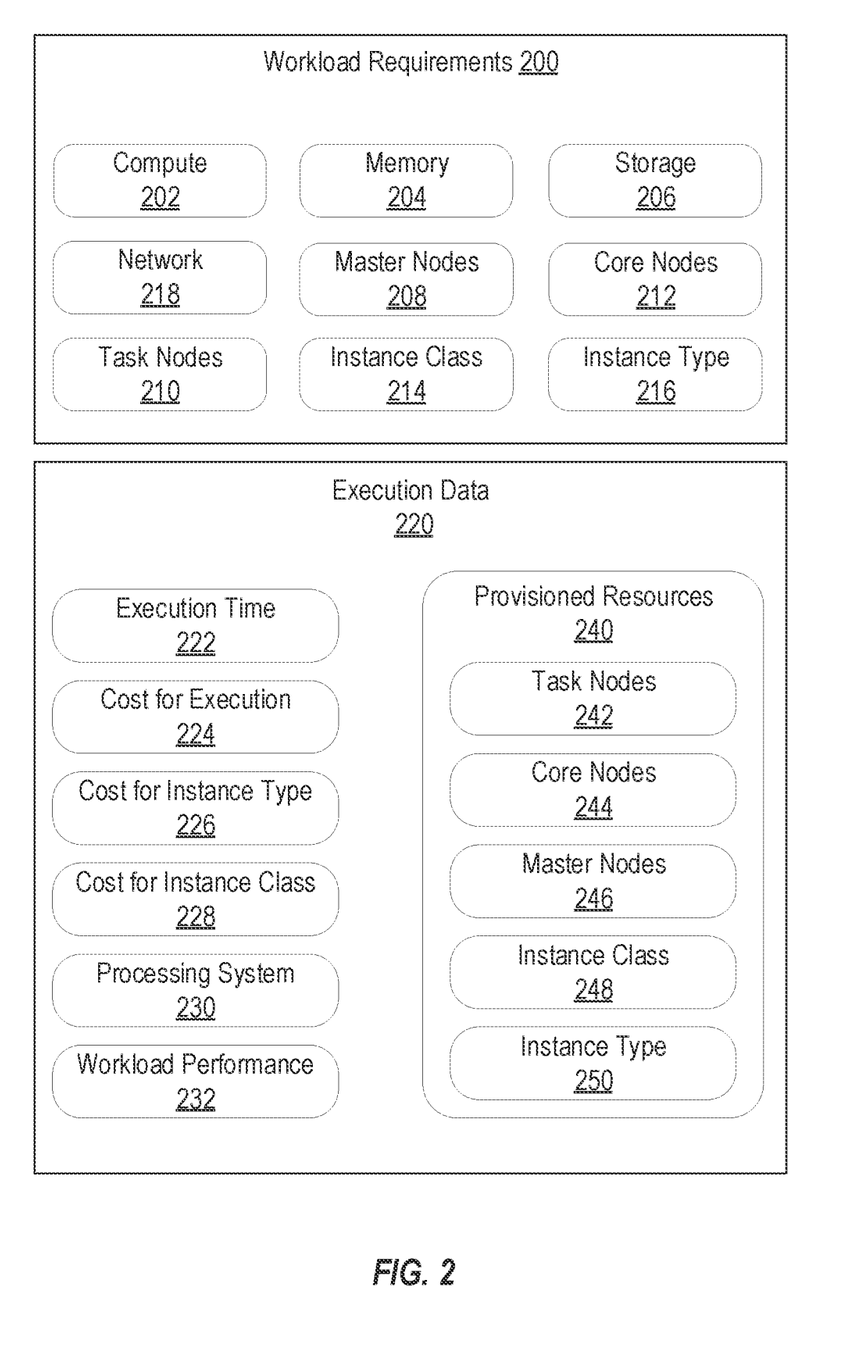
FIG. 2 depicts various example workload requirements and execution data.

FIG. 2 depicts example workload requirements 200, such as workload requirements 110 in FIG. 1, and execution data 220, such as execution data 112 in FIG. 1.

Workload requirements 200 include the processing resources required to process a workload, such as workload 102 in FIG. 1, on a processing system, such as processing system 106 in FIG. 1. Workload requirements 200 may be based on the workload to be executed and the type and availability of the processing system. In some embodiments, workload requirements 200 may be the minimum resources required to execute the workload. In some embodiments, workload requirements 200 may be the maximum resources required to execute the workload.

Workload requirements 200 may include, for example, a compute requirement 202, a memory requirement 204, a storage requirement 206, a requirement for one or more master nodes 208, a requirement for one or more task nodes 210, a requirement for one or more core nodes 212, a requirement for one or more instance classes 214, a requirement for one or more instance types 216, or a network requirement 218.

Compute requirement 202 may be a number of virtual processing cores required to process the workload.

Memory requirement 204 may be the required available memory to process instance data for the workload.

Storage requirement 206 may the storage capacity and type for each node required to process the workload.

Network requirement 218 may the required network bandwidth between nodes of the processing system to process the workload. A requirement for one or more master nodes 208 may be a required number of master nodes to manage and run the primary components of a workload. A master node may manage and allocate the resources of the processing system, track the status of processing system, and monitor core and task nodes.

A requirement for one or more task nodes 210 may be a required number of task nodes to perform parallel computation tasks on data for each instance.

A requirement for one or more core nodes 212 may be a required number of core nodes to coordinate data storage, accept and run tasks, and process parallel data for each instance.

A required instance class 214 may be associated with each instance required to process the workload. An instance class may be a general purpose instance, a compute optimized instance, a GPU optimized instance, a memory optimized instance, a storage optimized instance, or a cluster compute instance. A required instance type 216 may be associated with each node required to process the workload. An instance type depends on the required instance class 214. Each instance type is associated with an instance size, CPU, memory, storage, and network bandwidth for each instance required by the workload.

Note, workload requirements 200 are just example requirements associated with workloads, and other workloads having additional, alternative, or fewer requirements are possible consistent with this disclosure. Embodiments described herein may use some, none, or all of workload requirements 200.

Execution data 220 may include the processing resources used to process a workload, such as workload 102 in FIG. 1, on a processing system, such as processing system 106 in FIG. 1. Execution data 220 may be based on the processing configuration generated by a contextual bandit model and the resources provisioned in accordance with the processing configuration, in order to execute the workload.

Execution data 220 may include, for example, execution time 222, cost for execution 224, cost for instance type 226, cost for instance class 228, processing system 230, workload performance 232, and provisioned resources 240 used by the workload.

Execution time 222 may be the time taken to execute the workload on the processing system using the provisioned resources 240. In some embodiments, execution time 222 may include the time waiting for the workload to execute on the processing system, such as waiting in a workload management queue.

Cost for execution 224 may be a total cost to execute the workload on the processing system using the provisioned resources 240. The cost may include, for example, a monetary cost associated with the provisioned resources, a usage cost associated with the provisioned resources, etc. In some embodiments, the cost may be a differential between an estimated cost, based on the one or more workload requirements, and the actual cost, based on the executed workload.

Cost for instance type 226 may include a cost associated with each instance type used to execute the workload on the processing system. The cost may include, for example, a monetary cost associated with each instance type used, a usage cost associated with each instance type used, an unused cost associated with an excess of instance types, etc.

Cost for instance class 228 may include a cost associated with all the instances in a certain instance class used to execute the workload on the processing system. For example, a cost may be based on the number of general purpose instances, compute optimized instances, GPU optimized instances, memory optimized instances, storage optimized instances, or cluster compute instances used. The cost may include, for example, a monetary cost associated with all the instances used of each instance class.

Processing system 230 may include data associated with the processing system used to execute the workload. Such data may include, for example, a type of processing system, a host (e.g., remote or local), a software or firmware version of the processing system, an architecture of the processing system, a framework, an application or program used by the processing system, etc.

Workload performance 232 may include data associated with the performance of the execution of the workload on the processing system. Such data may include errors associated with performance, the resources used to execute, data loss, constrained resources, quality of the execution, etc.

Provisioned resources 240 may include the resources provisioned by the workload and used to execute the workload. Such resources may include the task nodes 242 used, the core nodes 244 used, the master nodes 246 used, the instance class 248 of each instance used, or the instance type 250 of each instance used.

Note, execution data 220 are just example data associated with processing of workloads and other processes having additional, alternative, or fewer data are possible consistent with this disclosure. Embodiments described herein may use some, none, or all of execution data 220.

Example Flow for Optimizing Workload Processing

Figure 3:
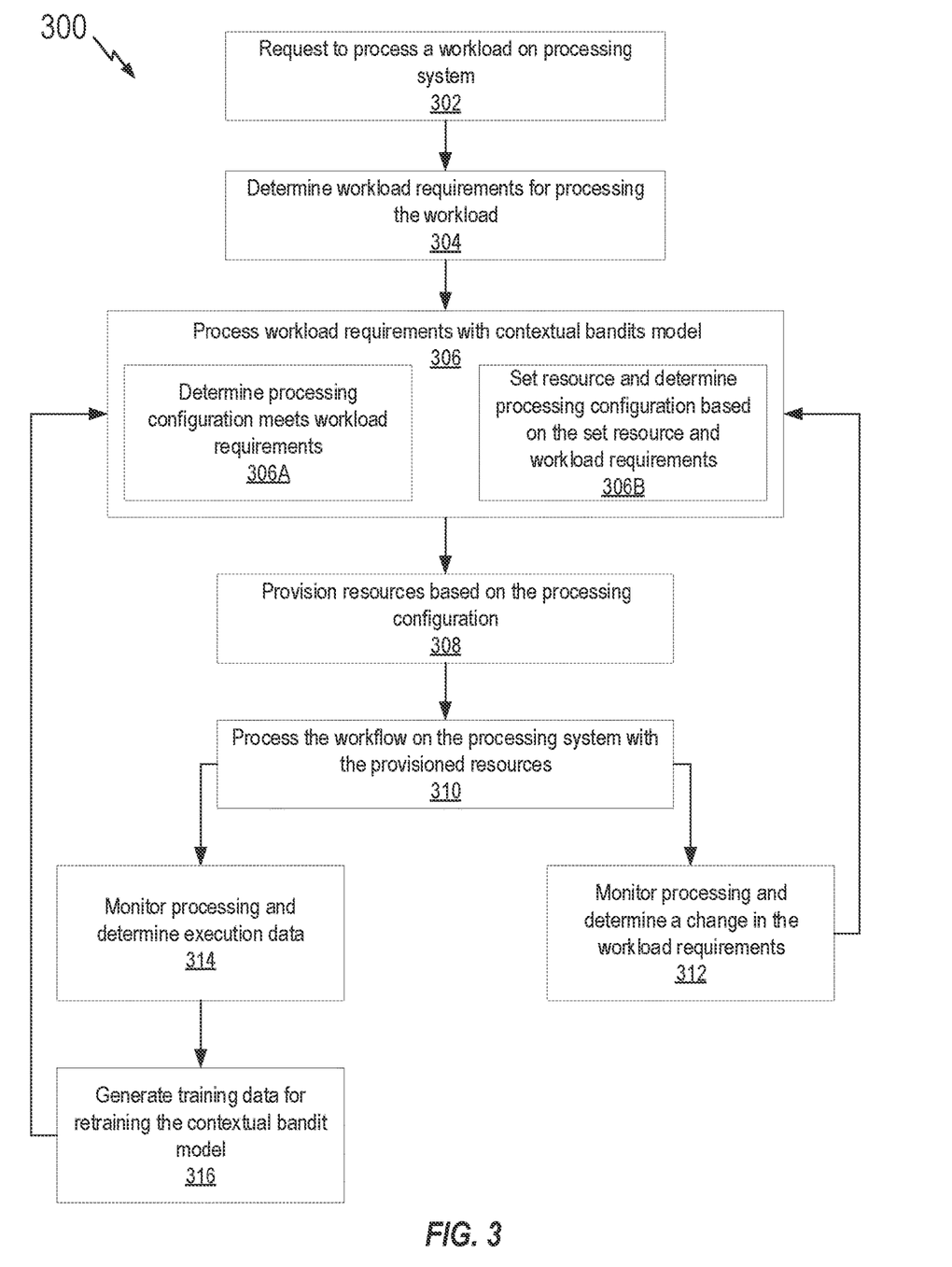
FIG. 3 depicts an example flowchart for optimizing processing of a workload on a remote processing system.

FIG. 3 depicts an example flow 300 for optimizing processing of a workload, such as workload 102 in FIG. 1, on a processing system, such as processing system 106 in FIG. 1.

Initially, flow 300 begins at step 302 with receiving a request to process a workload, on a processing system.

Flow 300 proceeds to step 304 with determining one or more workload requirements for processing the workload on the processing system. The one or more workload requirements may be, for example, one or more of workload requirements 200 in FIG. 2. In some embodiments, the workload is an ETL job and the one or more workload requirements may include an instance type, a number of core nodes, or a number of master nodes.

Flow 300 then proceeds to step 306 with processing the workload and the one or more workload requirements with a contextual bandit model to generate a processing configuration for processing the workload on the processing system that meets the one or more workload requirements. The contextual bandit model may be contextual bandit model 104 in FIG. 1. The contextual bandit model may use the workload and the one or more workload requirements, for example, one or more of the workload requirements 200 in FIG. 2, to generate the processing configuration.

A processing configuration may comprise a set of resource requirements for processing the workload on the processing system. For example, a processing configuration may include the number, class, and type of instances for processing the workload. In some embodiments, the processing configuration is configured to select a data processing framework and a number of instances of the data processing framework for processing the workload. The data processing framework may be associated with the processing system, such as processing system 106 in FIG. 1.

In some embodiments, such as at step 306A, a processing configuration is generated by the contextual bandit model, which is trained to recommend the processing configuration based on the one or more workload requirements and the workload.

In some embodiments, such as at step 306B, a resource for the processing configuration is set and the contextual bandit model generates the processing configuration including that resource. The contextual bandit model is trained to recommend the processing configuration with the set resource as a constraint based on one or more workload requirements and the workload. In some embodiments, the set resource may be a set instance or node. For example, the set resource may be a specific instance type. In some embodiments, the resource may be set based on a specific reduction of a workload requirement. For example, a set resource may be a number of instance nodes, such as 25% fewer instance nodes compared to the workload requirement for instance nodes.

Flow 300 then proceeds to step 308 with provisioning resources based on the processing configuration at the processing system.

Flow 300 then proceeds to step 310 with processing the workload on the processing system with the provisioned resources, such as on processing system 106 in FIG. 1. In some embodiments, the processing system may be a remote processing system.

Flow 300 then proceeds to step 312 with determining a change to one or more of the one or more workload requirements. The performance of the workload on the processing system may be monitored as the workload processes and one or more workload requirements may need to be changed based on the performance. For example, more compute, more memory, more storage, etc., may be needed based on the processing of workload on the processing system. In some embodiments, the change may be determined based on expiration of a timer, for example, when the workload is still processing after expiration of a timer (e.g., two hours), a change is determined. In some embodiments, the change may be determined based on service usage, for example, a cost associated with one or more of the workload requirements is exceeded. In some embodiments, the change may be determined based on a memory management failure, for example, where the processor default memory cannot process the workload. In some embodiments, the change may be determined based on a versioning failure, for example, where one version of a cluster processes, but another version of the cluster fails. In some embodiments, the change may be determined based on a network issue, for example, a network bandwidth issue or a latency issue. In embodiments where there is a network issue, the workload may need to be rerun.

Flow 300 then returns to step 306 and processes the workload and the changed one or more workload requirements with the contextual bandit model to generate a changed processing configuration for processing the workload on the processing system.

The processing system re-allocates or provisions additional resources based on the changed processing configuration at step 308. Then flow 300 proceeds to step 310 with processing (or continuing to process) the workload on the processing system with the provisioned resources. Flow 300 may proceed to step 312 and iteratively monitor and determine a change in one or more workload requirements throughout processing of the workload.

Flow 300 then proceed to step 314 with monitoring the processing of the workload on the processing system and determine execution data, such as execution data 112 in FIG. 1 or execution data 220 in FIG. 2.

Flow 300 then proceeds to step 316 with generating training data, such as training data 118 in FIG. 1, using the execution data for retaining the contextual bandit model. Training data may be processed with a reward function to generate a reward associated with the execution. The training data, including the reward, may be used to retrain the contextual bandit model.

Note that flow 300 is just one example, and other flows having additional, fewer, alternative, or differently ordered steps may be implemented.

Example Method for Optimizing Workload Processing

Figure 4:
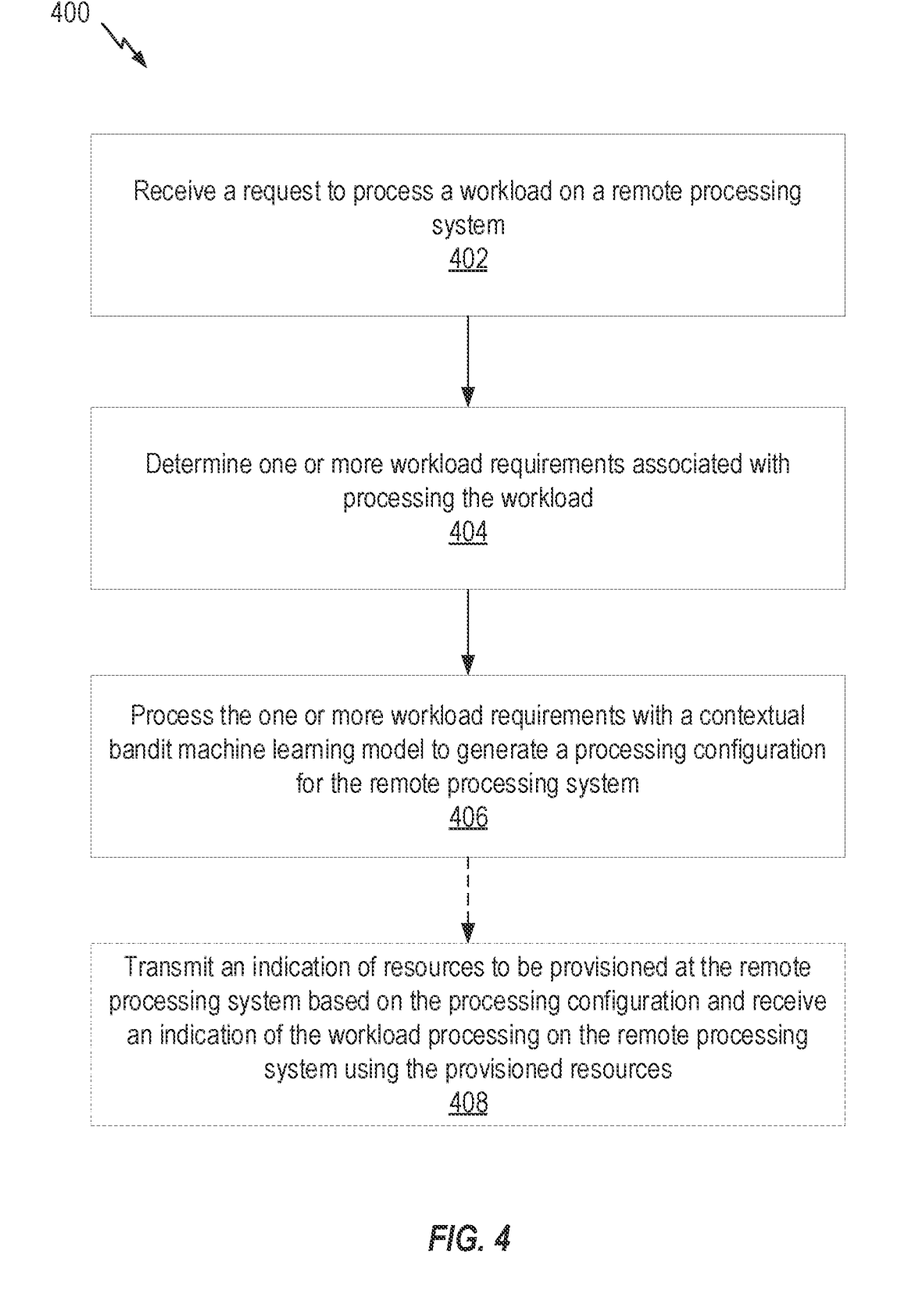
FIG. 4 depicts an example method for optimizing processing of a workload on a processing system.

FIG. 4 depicts an example method 400 for optimizing a workload, such as workload 102, for processing on a processing system, such as processing system 106.

Initially, method 400 begins at step 402 with receiving a request to process a workload on a remote processing system, such as described at step 302 in FIG. 3.

Method 400 proceeds to step 404 with determining one or more workload requirements associated with processing the workload, such as described at step 304 in FIG. 3. Such workload requirements may include, for example, workload requirements 200 described with respect to FIG. 2.

In some embodiments, the workload is an ETL job; and the one or more workload requirements comprise at least one of an instance type; a number of core nodes, or a number of master nodes.

Method 400 then proceeds to step 406 with processing the one or more workload requirements with a contextual bandit machine learning model to generate a processing configuration for the remote processing system. In some embodiments, the contextual bandit machine learning model is trained to reduce processing resource usage by the remote processing system while meeting the one or more workload requirements, such as described at step 306A in FIG. 3.

In some embodiments, the processing configuration outputted by the contextual bandit model is configured to select a data processing framework and a number of instances of the data processing framework for processing the workload.

Method 400 optionally then proceeds to step 408 with transmitting an indication of resources to be provisioned at the remote processing system based on the processing configuration; and receiving an indication of the workload processing on the remote processing system using the provisioned resources, such as described at steps 308-310 in FIG. 3.

In some embodiments, method 400 further comprises: determining a change to the one or more workload requirements after receiving the indication of the workload processing at the remote processing system; processing changed one or more workload requirements with the contextual bandit machine learning model to generate a changed processing configuration for the remote processing system; and transmitting an indication of changed resources to be provisioned at the remote processing system based on the changed processing configuration, such as described at step 312 in FIG. 3.

In some embodiments, method 400 further comprises: determining a processing resource reduction based on receiving the indication of the workload processing on the remote processing system using the provisioned resources; generating training data for the contextual bandit machine learning model based on the processing resource reduction; and updating the contextual bandit machine learning model with the training data, such as described at steps 314-316 in FIG. 3.

In some embodiments, the contextual bandit machine learning model comprises at least one of: a linear contextual bandit model; a tree-based contextual bandit model; a deep contextual bandit model; or a Thompson sampling contextual bandit model.

In some embodiments, the one or more workload requirements comprises at least one of: a CPU requirement; a memory requirement; or a storage requirement.

Beneficially, then, method 400 avoids over-provisioning resources or under-provisioning resources needed to process the workload, by using the contextual bandit model to generate an efficient processing configuration for the workload.

Note that method 400 is just one example, and other methods have additional, fewer, alternative, or differently ordered steps may be implemented.

Example Method for Optimizing Workload Processing

Figure 5:
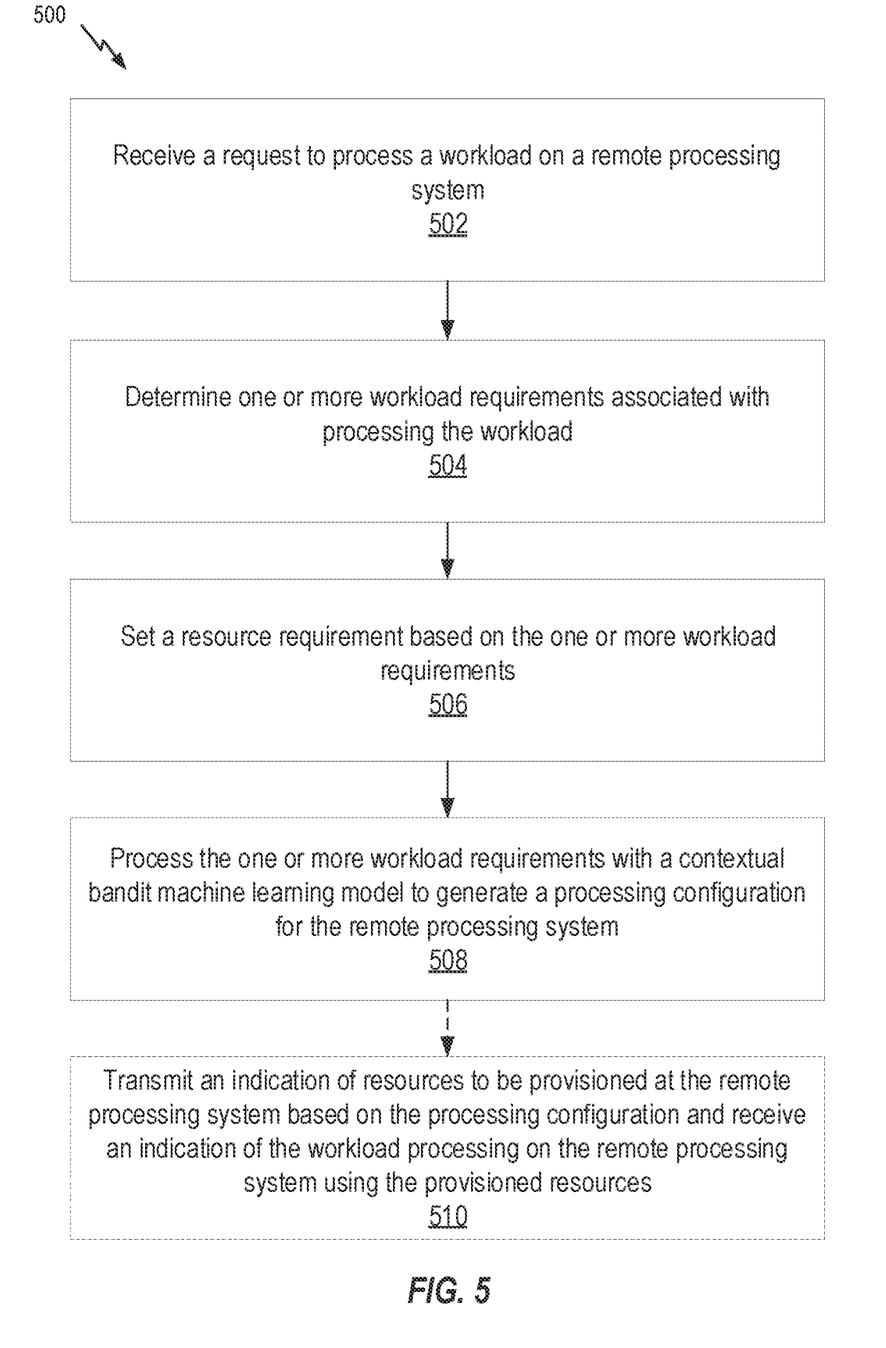
FIG. 5 depicts another example method for optimizing processing of a workload on a processing system.

FIG. 5 depicts another example method 500 for optimizing a workload, such as workload 102 in FIG. 1, for processing on a processing system, such as processing system 106 in FIG. 1.

Initially, method 500 begin at step 502 with receiving a request to process a workload on a remote processing system, such as described at step 302 in FIG. 3.

Method 500 proceeds to step 504 with determining one or more workload requirements associated with processing the workload, such as described at step 304 in FIG. 3. In some embodiments, the workload is an ETL job; and the one or more workload requirements comprise at least one of an instance type; a number of core nodes, or a number of master nodes. In some embodiments, the one or more workload requirements comprises at least one of: a CPU requirement; a memory requirement; or a storage requirement. Such workload requirements may include, for example, workload requirements 200 described with respect to FIG. 2.

In some embodiments, the one of the one or more workload requirements is an instance type; and the change to the one of the one or more workload requirements is a change in the instance type.

Method 500 then proceeds to step 506 with setting a resource requirement based on the one or more workload requirements. In some embodiments, setting the resource requirement comprises: determining a change to one of the one or more workload requirements; and setting the one of the one or more workload requirements according to the change.

In some embodiments, the one of the one or more workload requirements is a number of instance nodes; and the change to the one of the one or more workload requirements is a reduction in the number of instance nodes.

Method 500 then proceeds to step 508 with processing the one or more workload requirements and the resource requirement with a contextual bandit machine learning model to generate a processing configuration for the remote processing system, wherein the contextual bandit machine learning model is trained to reduce processing resource usage by the remote processing system while meeting the one or more workload requirements and the processing configuration uses the resource requirement, such as described at step 306B in FIG. 3.

In some embodiments, the processing configuration is configured to select a data processing framework and a number of instances of the data processing framework for processing the workload.

In some embodiments, the contextual bandit machine learning model comprises at least one of: a linear contextual bandit model; a tree-based contextual bandit model; a deep contextual bandit model; or a Thompson sampling contextual bandit model.

Method 500 optionally then proceeds to step 510 with transmitting an indication of resources to be provisioned at the remote processing system based on the processing configuration; and receiving an indication of the workload processing on the remote processing system using the provisioned resources, such as described at steps 308-310 in FIG. 3.

In some embodiments, method 500 further comprises: determining a change to the one or more workload requirements after receiving the indication of the workload processing at the remote processing system; processing changed one or more workload requirements with the contextual bandit machine learning model to generate a changed processing configuration for the remote processing system; and transmitting an indication of changed resources to be provisioned at the remote processing system based on the changed processing configuration, such as described at step 312 in FIG. 3.

In some embodiments, method 500 further comprises: determining a processing resource reduction based on receiving the indication of the workload processing on the remote processing system using the provisioned resources; generating training data for the contextual bandit machine learning model based on the processing resource reduction; and updating the contextual bandit machine learning model with the training data, such as described at steps 314-316 in FIG. 3.

Beneficially, then, method 500 utilizes available resources to process the workload and avoids over-provisioning resources or under-provisioning other resources needed to process the workload, by using the contextual bandit model to generate an efficient processing configuration for the workload constrained by the available resources.

Note that method 500 is just one example, and other methods have additional, fewer, alternative, or differently ordered steps may be implemented.

Figure 6A:
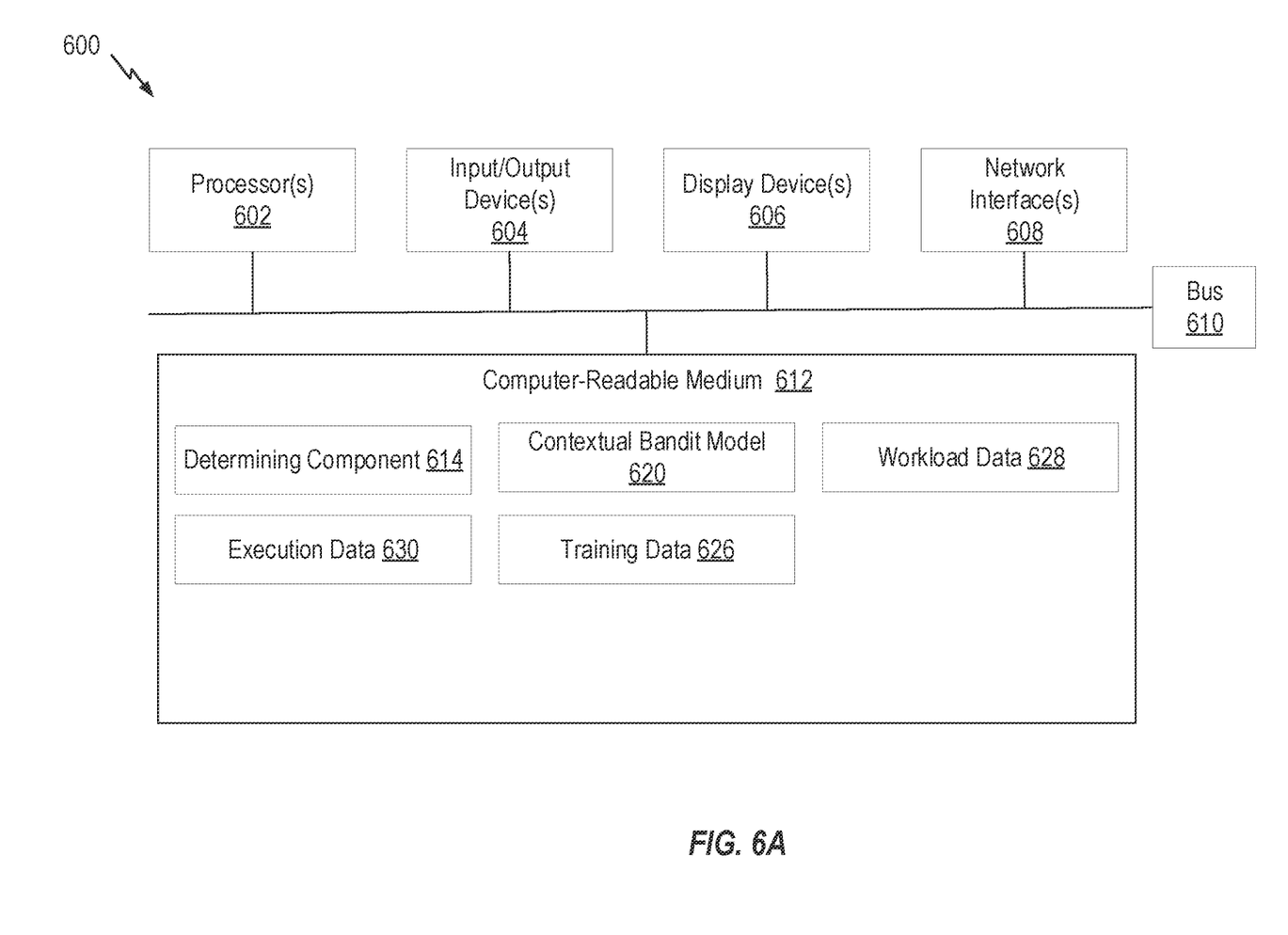
FIGS. 6A and 6B depict example processing systems with which aspects of the present disclosure can be performed.

Example Processing System for Optimizing a Workload for Processing on a Processing System FIG. 6A depicts an example processing system 600 configured to perform various aspects described herein, including, for example, flow 300 as described above with respect to FIG. 3, method 400 as described above with respect to FIG. 4, and method 500 as described above with respect to FIG. 5.

Processing system 600 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 600 includes one or more processors 602, one or more input/output devices 604, one or more display devices 606, and one or more network interfaces 608 through which processing system 600 is connected to one or more networks (e.g., a local network, an intranet, the Internet, or any other group of processing systems communicatively connected to each other), and computer-readable medium 612.

In the depicted example, the aforementioned components are coupled by a bus 610, which may generally be configured for data and/or power exchange amongst the components. Bus 610 may be representative of multiple buses, while only one is depicted for simplicity.

Processor(s) 602 are generally configured to retrieve and execute instructions stored in one or more memories, including local memories like the computer-readable medium 612, as well as remote memories and data stores. Similarly, processor(s) 602 are configured to retrieve and store application data residing in local memories like the computer-readable medium 612, as well as remote memories and data stores. More generally, bus 610 is configured to transmit programming instructions and application data among the processor(s) 602, display device(s) 606, network interface(s) 608, and computer-readable medium 612. In certain embodiments, processor(s) 602 are included to be representative of a one or more central processing units (CPUs), graphics processing unit (GPUs), tensor processing unit (TPUs), accelerators, and other processing devices.

Input/output device(s) 604 may include any device, mechanism, system, interactive display, and/or various other hardware components for communicating information between processing system 600 and a user of processing system 600. For example, input/output device(s) 604 may include input hardware, such as a keyboard, touch screen, button, microphone, and/or other device for receiving inputs from the user. Input/output device(s) 604 may further include display hardware, such as, for example, a monitor, a video card, and/or other another device for sending and/or presenting visual data to the user. In certain embodiments, input/output device(s) 604 is or includes a graphical user interface.

Display device(s) 606 may generally include any sort of device configured to display data, information, graphics, user interface elements, and the like to a user. For example, display device(s) 606 may include internal and external displays such as an internal display of a tablet computer or an external display for a server computer or a projector. Display device(s) 606 may further include displays for devices, such as augmented, virtual, and/or extended reality devices.

Network interface(s) 608 provide processing system 600 with access to external networks and thereby to external processing systems. Network interface(s) 608 can generally be any device capable of transmitting and/or receiving data via a wired or wireless network connection. Accordingly, network interface(s) 608 can include a communication transceiver for sending and/or receiving any wired and/or wireless communication. For example, Network interface(s) 608 may include an antenna, a modem, a LAN port, a Wi-Fi card, a WiMAX card, cellular communications hardware, near-field communication (NFC) hardware, satellite communication hardware, and/or any wired or wireless hardware for communicating with other networks and/or devices/systems. In certain embodiments, network interface(s) 608 includes hardware configured to operate in accordance with the Bluetooth® wireless communication protocol.

Computer-readable medium 612 may be a volatile memory, such as a random access memory (RAM), or a nonvolatile memory, such as nonvolatile random access memory, phase change random access memory, or the like. In this example, computer-readable medium 612 includes determining component 614, contextual bandit machine learning model 620, training data 626, workload data 628, and execution data 630.

In certain embodiments, determining component 614 may be configured to determine one or more workload requirements, such as workload requirements 200 in FIG. 2 associated with processing the workload. In some embodiments, determining component may be configured to determine a change to one or more workload requirements after provisioning the resources at the remote processing system.

In certain embodiments, contextual bandit machine learning model 620 may be configured to generate a processing configuration for the remote processing system, such as processing system 106 in FIG. 1, by processing the one or more workload requirements. Contextual bandit machine learning model may be trained to reduce processing resource usage by the remote processing system while meeting the one or more workload requirements.

In certain embodiments, training data 626 may be data used to train contextual bandit machine learning model, such as training data 108 in FIG. 1.

In certain embodiments, workload data 628 may be data associated with the workload, and may include one or more workload requirements, such as workload requirements 110 in FIG. 1, or workload requirements 200 in FIG. 2.

In certain embodiments, execution data 630 may be data associated with processing the workload on the processing system, such as execution data 112 in FIG. 1.

Figure 6B:
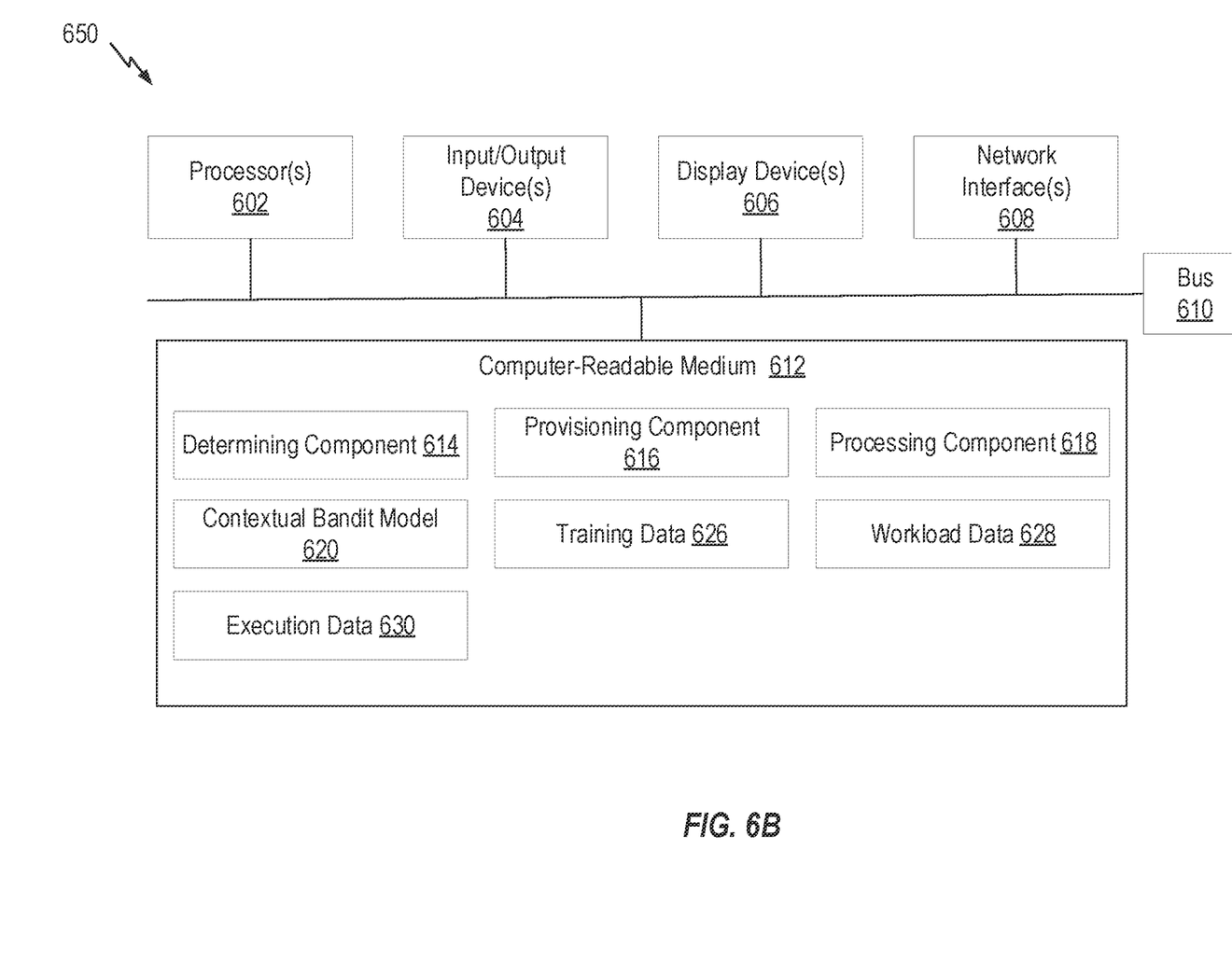

FIG. 6B depicts another example processing system 650 configured to perform various aspects described herein, including, for example, flow 300 as described above with respect to FIG. 3. Generally, all like number aspects of FIG. 6B are as described in FIG. 6A. However, in FIG. 6B, computer-readable medium 612 includes provisioning component 616 and processing component 618.

In certain embodiments, provisioning component 616 may be configured to provision resource at the remote processing system based on the processing configuration.

In certain embodiments, processing component 618 may be configured to process the workload on the remote processing system based on the processing configuration.

Note that FIGS. 6A and 6B are just some examples of a processing system consistent with embodiments described herein, and other processing systems having additional, alternative, or fewer components are possible consistent with this disclosure.

Example Clauses

Implementation examples are described in the following numbered clauses:

Clause 1: A method, comprising: receiving a request to process a workload on a remote processing system; determining one or more workload requirements associated with processing the workload; and processing the one or more workload requirements with a contextual bandit machine learning model to generate a processing configuration for the remote processing system, wherein the contextual bandit machine learning model is trained to reduce processing resource usage by the remote processing system while meeting the one or more workload requirements.

Clause 2: The method of Clause 1, further comprising: transmitting an indication of resources to be provisioned at the remote processing system based on the processing configuration; and receiving an indication of the workload processing on the remote processing system using the provisioned resources.

Clause 3: The method of Clauses 2, further comprising: determining a change to the one or more workload requirements after receiving the indication of the workload processing at the remote processing system; processing changed one or more workload requirements with the contextual bandit machine learning model to generate a changed processing configuration for the remote processing system; and transmitting an indication of changed resources to be provisioned at the remote processing system based on the changed processing configuration.

Clause 4: The method of any one of Clauses 1-3, wherein: the workload is an extract, transform, load (ETL) job; and the one or more workload requirements comprise at least one of an instance type; a number of core nodes, or a number of master nodes.

Clause 5: The method of any one of Clauses 1-4, further comprising: determining a processing resource reduction based on receiving the indication of the workload processing on the remote processing system using the provisioned resources; generating training data for the contextual bandit machine learning model based on the processing resource reduction; and updating the contextual bandit machine learning model with the training data.

Clause 6: The method of any one of Clauses 1-5, wherein the contextual bandit machine learning model comprises at least one of: a linear contextual bandit model; a tree-based contextual bandit model; a deep contextual bandit model; or a Thompson sampling contextual bandit model.

Clause 7: The method of any one of Clauses 1-7, wherein the one or more workload requirements comprises at least one of: a CPU requirement; a memory requirement; or a storage requirement.

Clause 8: The method of any one of Clauses 1-8, wherein the processing configuration is configured to select a data processing framework and a number of instances of the data processing framework for processing the workload.

Clause 9: A method, comprising: receiving a request to process a workload on a remote processing system; determining one or more workload requirements associated with processing the workload; setting a resource requirement based on the one or more workload requirements; and processing the one or more workload requirements and the resource requirement with a contextual bandit machine learning model to generate a processing configuration for the remote processing system, wherein the contextual bandit machine learning model is trained to reduce processing resource usage by the remote processing system while meeting the one or more workload requirements and the processing configuration uses the resource requirement.

Clause 10: The method of Clause 9, further comprising: transmitting an indication of resources to be provisioned at the remote processing system based on the processing configuration; and receiving an indication of the workload processing on the remote processing system using the provisioned resources Clause 11: The method of any one of Clauses 9-10, wherein: the workload is an extract, transform, load (ETL) job; and the one or more workload requirements comprise at least one of an instance type; a number of core nodes, or a number of master nodes.

Clause 12: The method of any one of Clauses 9-11, wherein setting the resource requirement comprises: determining a change to one of the one or more workload requirements; and setting the one of the one or more workload requirements according to the change.

Clause 13: The method of Clause 12, wherein: the one of the one or more workload requirements is an instance type; and the change to the one of the one or more workload requirements is a change in the instance type.

Clause 14: The method of Clause 12, wherein: the one of the one or more workload requirements is a number of instance nodes; and the change to the one of the one or more workload requirements is a reduction in the number of instance nodes.

Clause 15: The method of any one of Clauses 9-14, wherein the contextual bandit machine learning model comprises at least one of: a linear contextual bandit model; a tree-based contextual bandit model; a deep contextual bandit model; or a Thompson sampling contextual bandit model.

Clause 16: The method of any one of Clauses 9-15, wherein the one or more workload requirements comprises at least one of: a CPU requirement; a memory requirement; or a storage requirement.

Clause 17: The method of any one of Clauses 9-16, wherein the processing configuration is configured to select a data processing framework and a number of instances of the data processing framework for processing the workload.

Clause 18: The method of Clause 10, further comprising: determining a change to the one or more workload requirements after receiving the indication of the workload processing at the remote processing system; processing changed one or more workload requirements with the contextual bandit machine learning model to generate a changed processing configuration for the remote processing system; and transmitting an indication of changed resources to be provisioned at the remote processing system based on the changed processing configuration.

Clause 19: The method of any one of Clauses 9-18, further comprising: determining a processing resource reduction based on receiving the indication of the workload processing on the remote processing system using the provisioned resources; generating training data for the contextual bandit machine learning model based on the processing resource reduction; and updating the contextual bandit machine learning model with the training data.

Clause 20: A processing system, comprising: a memory comprising computer-executable instructions; and a processor configured to execute the computer-executable instructions and cause the processing system to perform a method in accordance with any one of Clauses 1-19.

Clause 21: A processing system, comprising means for performing a method in accordance with any one of Clauses 1-19.

Clause 22: A non-transitory computer-readable medium storing program code for causing a processing system to perform the steps of any one of Clauses 1-19.

Clause 23: A computer program product embodied on a computer-readable storage medium comprising code for performing a method in accordance with any one of Clauses 1-19.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving a request to process a workload on a remote processing system;
determining one or more workload requirements associated with processing the workload; and
processing the one or more workload requirements with a contextual bandit machine learning model to generate a processing configuration for the remote processing system, wherein:
the contextual bandit machine learning model is trained to reduce processing resource usage by the remote processing system while meeting the one or more workload requirements, and
the processing configuration is configured to select a data processing framework and a number of instances of the data processing framework for processing the workload.

2. The method of claim 1, further comprising:
transmitting an indication of resources to be provisioned at the remote processing system based on the processing configuration; and
receiving an indication of the workload processing on the remote processing system using the provisioned resources.

3. The method of claim 2, further comprising:
determining a change to the one or more workload requirements after receiving the indication of the workload processing at the remote processing system;
processing changed one or more workload requirements with the contextual bandit machine learning model to generate a changed processing configuration for the remote processing system; and
transmitting an indication of changed resources to be provisioned at the remote processing system based on the changed processing configuration.

4. The method of claim 2, further comprising:
determining a processing resource reduction based on receiving the indication of the workload processing on the remote processing system using the provisioned resources;
generating training data for the contextual bandit machine learning model based on the processing resource reduction; and
updating the contextual bandit machine learning model with the training data.

5. The method of claim 1, wherein:
the workload is an extract, transform, load (ETL) job; and
the one or more workload requirements comprise at least one of an instance type; a number of core nodes; or a number of master nodes.

6. The method of claim 1, wherein the contextual bandit machine learning model comprises at least one of:
a linear contextual bandit model;
a tree-based contextual bandit model;
a deep contextual bandit model; or
a Thompson sampling contextual bandit model.

7. The method of claim 1, wherein the one or more workload requirements comprises at least one of:
a CPU requirement;
a memory requirement; or
a storage requirement.

8. The method of claim 1, wherein the processing configuration comprises a set of resource requirements for processing the workload on the remote processing system.

9. The method of claim 1, wherein the data processing framework is associated with the remote processing system.

10. A method, comprising:
receiving a request to process a workload on a remote processing system;
determining one or more workload requirements associated with processing the workload;
setting a resource requirement based on the one or more workload requirements, wherein the resource requirement is a specific reduction of one of the one or more workload requirements; and
processing the one or more workload requirements and the resource requirement with a contextual bandit machine learning model to generate a processing configuration for the remote processing system, wherein
the contextual bandit machine learning model is trained to reduce processing resource usage by the remote processing system while meeting the one or more workload requirements and the processing configuration uses the resource requirement, and
the processing configuration is configured to select a data processing framework and a number of instances of the data processing framework for processing the workload.

11. The method of claim 10, further comprising:
transmitting an indication of resources to be provisioned at the remote processing system based on the processing configuration; and
receiving an indication of the workload processing on the remote processing system using the provisioned resources.

12. The method of claim 11, further comprising:
determining a processing resource reduction based on receiving the indication of the workload processing on the remote processing system using the provisioned resources;
generating training data for the contextual bandit machine learning model based on the processing resource reduction; and
updating the contextual bandit machine learning model with the training data.

13. The method of claim 10, wherein:
the workload is an extract, transform, load (ETL) job; and the one or more workload requirements comprise at least one of an instance type; a number of core nodes; or a number of master nodes.

14. The method of claim 10, wherein setting the resource requirement comprises:
    determining a change to one of the one or more workload requirements; and
    setting the one of the one or more workload requirements according to the change.

15. The method of claim 14, wherein:
    the one of the one or more workload requirements is an instance type; and
    the change to the one of the one or more workload requirements is a change in the instance type.

16. The method of claim 14, wherein:
    the one of the one or more workload requirements is a number of instance nodes; and
    the change to the one of the one or more workload requirements is a reduction in the number of instance nodes.

17. The method of claim 10, wherein the contextual bandit machine learning model comprises at least one of:
    a linear contextual bandit model;
    a tree-based contextual bandit model;
    a deep contextual bandit model; or
    a Thompson sampling contextual bandit model.

18. The method of claim 10, wherein the one or more workload requirements comprises at least one of:
    a CPU requirement;
    a memory requirement; or
    a storage requirement.

19. A processing system, comprising: a memory comprising computer-executable instructions; and a processor configured to execute the computer-executable instructions and cause the processing system to:
    receive a request to process a workload on a remote processing system;
    determine one or more workload requirements associated with processing the workload; and
    process the one or more workload requirements with a contextual bandit machine learning model to generate a processing configuration for the remote processing system, wherein:
    the contextual bandit machine learning model is trained to reduce processing resource usage by the remote processing system while meeting the one or more workload requirements, and
    the processing configuration is configured to select a data processing framework and a number of instances of the data processing framework for processing the workload.

20. The processing system of claim 19, wherein the processor is further configured to cause the processing system to:
    transmit an indication of resources to be provisioned at the remote processing system based on the processing configuration; and
    receive an indication of the workload processing on the remote processing system using the provisioned resources.

\* \* \* \* \*